(12) United States Patent
Burgin et al.

(10) Patent No.: US 9,505,178 B2
(45) Date of Patent: Nov. 29, 2016

(54) PRODUCTION PROCESS FOR A MOULDED MULTILYER LINING

(75) Inventors: Thomas Burgin, Freienstein (CH);
Pierre Daniere, Milford, MI (US);
Philippe Godano, Winterthur (CH);
Stefan Konigbauer, Winterthur (CH);
Wenzel Krause, Winterthur (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 466 days.

(21) Appl. No.: 14/006,253

(22) PCT Filed: Mar. 13, 2012

(86) PCT No.: PCT/EP2012/054383
§ 371 (c)(1),
(2), (4) Date: Dec. 2, 2013

(87) PCT Pub. No.: WO2012/126775
PCT Pub. Date: Sep. 27, 2012

(65) Prior Publication Data
US 2014/0124972 A1    May 8, 2014

(30) Foreign Application Priority Data
Mar. 23, 2011   (EP) .................................... 11159402

(51) Int. Cl.
*B29C 70/02*   (2006.01)
*B32B 5/02*   (2006.01)
(Continued)

(52) U.S. Cl.
CPC ........... *B29C 70/026* (2013.01); *B29C 70/086* (2013.01); *B29C 43/203* (2013.01); *B29C 70/46* (2013.01); *B32B 5/02* (2013.01); *B60R 13/08* (2013.01)

(58) Field of Classification Search
CPC ... B29C 70/026; B29C 70/086; B29C 70/46; B29C 43/20; B29C 43/203; B32B 5/24; B32B 3/26; B32B 15/18; B32B 5/14; B32B 5/02; B60R 13/08
See application file for complete search history.

(56) References Cited

U.S. PATENT DOCUMENTS 3,993,806 A * 11/1976 Athey .................. D04H 1/4334
427/196
4,923,555 A * 5/1990 Elliott ..................... B32B 37/06
100/74

(Continued)

FOREIGN PATENT DOCUMENTS

DE    198 32 721    1/2000
EP    0 370 991    5/1990

(Continued)

OTHER PUBLICATIONS

International search opinion.*

(Continued)

*Primary Examiner* — Alison L Hindenlang
*Assistant Examiner* — Jerzi H Moreno Hernandez
(74) *Attorney, Agent, or Firm* — Standley Law Group LLP

(57) ABSTRACT

Production method for a multilayer lining for thermal and sound insulation with the steps of blending reinforcement fibers and polyamide matrix material, in the form of fibers, flakes or powder, and forming a web of said blend; layering said blended web and at least an additional layer chosen from an open cell foam layer, a heat reflective layer, or another of said blended web inside a mold; treating the stacked multilayer material with pressurized saturated steam, such that the polyamide matrix material in the blended web is melting at a temperature under steam pressure that is lower than the melting temperature of the polyamide matrix according to DSC, thereby binding the reinforcement fibers together thus consolidating the blended web forming a porous reinforcement layer, and all layers of the multilayer are laminated together.

14 Claims, 1 Drawing Sheet

(51) Int. Cl.
*B29C 70/08* (2006.01)
*B60R 13/08* (2006.01)
*B29C 70/46* (2006.01)
*B29C 43/20* (2006.01)

(56) References Cited

U.S. PATENT DOCUMENTS

| | | | |
|---|---|---|---|
| 5,016,936 A * | 5/1991 | Goodrich | B32B 5/02 296/39.3 |
| 5,134,016 A * | 7/1992 | Geary, Jr. | C08J 5/048 428/198 |
| 5,234,523 A | 8/1993 | Battreall | |
| 5,441,675 A * | 8/1995 | Souders | B29C 33/046 264/321 |
| 5,494,627 A | 2/1996 | Kargol et al. | |
| 6,103,180 A * | 8/2000 | Haeseker | B29C 70/46 264/119 |
| 6,682,618 B1 * | 1/2004 | Bowers | D02G 3/402 156/72 |
| 6,749,929 B1 * | 6/2004 | Enkler | B32B 5/24 181/286 |
| 2005/0006173 A1 | 1/2005 | Albin | |
| 2005/0140059 A1 | 6/2005 | Ernst et al. | |
| 2007/0160799 A1 * | 7/2007 | Nguyen | C08G 63/916 428/74 |
| 2012/0052283 A1 * | 3/2012 | Gehani | B29C 44/5681 428/317.1 |
| 2012/0064334 A1 * | 3/2012 | Klautke | B60R 13/0876 428/332 |

FOREIGN PATENT DOCUMENTS

| | | |
|---|---|---|
| EP | 0 647 519 | 4/1995 |
| EP | 0 590 112 | 11/2003 |
| EP | 1 656 243 | 5/2008 |
| EP | 2 298 541 | 3/2011 |
| WO | WO 2011032908 A1 * | 3/2011 ............ B29C 70/46 |

OTHER PUBLICATIONS

International Search Report issued by the European Patent Office in corresponding International Application No. PCT/EP2012/054383.

International Search Report issued by the European Patent Office in corresponding International Application No. PCT/EP2012/054279.

* cited by examiner

PRODUCTION PROCESS FOR A MOULDED MULTILYER LINING

CROSS-REFERENCE TO RELATED APPLICATIONS

This is a U.S. National Phase Application of International Application No. PCT/EP2012/054383, filed Mar. 12, 2012, which claims the benefit of priority to European Patent Application No. 11159402.4, filed Mar. 23, 2011, which is incorporated herein by reference.

TECHNICAL FIELD

The invention relates to a method of producing a moulded multilayer lining for heat and sound insulation, for in particularly the engine compartment of motor vehicles.

BACKGROUND ART

Acoustical and thermal liners for application to vehicles are well known in the art. These liners typically rely upon both sound absorption, i.e. the ability to absorb incident sound waves, and transmission loss, i.e. the ability to reflect incident sound waves, in order to provide sound attenuation. They also rely on thermal shielding properties to prevent or reduce the transmission of heat from various heat sources (engine, transmission and exhaust system), to the passenger compartment of the vehicle. Such liners are in particularly used in the engine bay area of a vehicle, for instance employed as an engine cover so as to attenuate the sound of the engine closer to its source.

In the engine compartment of motor vehicles, including passenger and commercial vehicles, sound proofing parts in the form of absorbers are increasingly being used to reduce engine noise. In general, these absorbers are designed as moulded articles to reduce the exterior and interior noise of vehicles. The moulded articles may be made from webs (e.g. cotton) or from polyurethane foam, and typically have thermo stabilities up to about 160° C.

In certain areas, such as exhaust manifolds, hot air recirculation areas or around the engine itself, the moulded articles may be subjected to high thermal loads. Thus these moulded articles are often laminated, partially or completely, with aluminium foil to serve as heat reflectors in order to protect the underlying nonwoven. In general the aluminium foil is thick enough to function as the carrier layer, enabling the mechanical properties for the part to be self-supportive. The sound absorbing material is kept as loose material and as thick as possible to optimise the acoustic properties of the part. For example DE 8700919 discloses such an aluminium laminate with foam glued to the inside for insulating purposes. Other examples are made of sandwiching loose fibrous material mats between two metal foil layers whereby the metal layers do have structural carrier properties.

In recent times composite thermal liners are partly replacing the typical heat shield trim parts. These composite liners are generally formed as multilayer assemblies. These assemblies are build with a thermally exposed layer having reflective and impervious functions, and a composite layer having good thermal insulating, mechanical and structural properties and sometimes with an additional top layer for appearance and imperviousness properties. These types of liners are produced using injection moulding or compression moulding. The disadvantage of these composite thermal liners is that they are impervious and heavy structural parts. Although they have good thermal and structural properties, they lack acoustic and thermal attenuating properties in most of the cases.

While a number of adhesives, adhesive webs and binding fibers have been specifically developed over the years to secure the various layers of the laminates together, laminated liners and insulators have an inherent risk of delamination and failure. This potential risk is significant mainly due to the harsh operating environment to which such liners and insulators are subjected. Many liners and insulators are located near and/or designed to shield hot heat sources such as the engine, transmission and components of the exhaust system. As a result the liners and insulators are often subjected to temperature in excess of 180° C., at which the adhesives or binders show a strong and fast degradation over time.

In addition parts directly mounted adjacent to the engine are likely to vibrate and cause noises due to vibrations transmitted from the engine. These vibrating parts can form an unwanted additional noise. Another aspect is the fatigue properties of the lining involved, the frequency of the vibration can have a negative effect on the overall lifespan of the lining.

A further disadvantage of the state of the art is the high temperature needed to obtain the final composite. The heating temperature to be achieved is dependent on the matrix polymer. In general to form the composite, the matrix and reinforcement fibres are heated using dry heating methods like hot air, contact heating or infrared heating. In order to compensate for the temperature loss for instance from the heating device to the moulding device, the product is normally heated above the true melting point of the matrix polymer or above the activating temperature of the binding resin. Heating of a polymer above the melting point accelerates degradation.

Using a contact heater has the additional disadvantage that the product has to be compressed to obtain a good transfer of heat throughout the thickness of the product. Hot air is generally used at a temperature above the melting temperature of the binder polymer so the polymer gets heat damaged, while the use of infrared heating is only feasible for thin materials. In thicker materials the amount of energy needed to heat the inner material is damaging for the outer surface polymers. This method is normally used only for a thickness up till 4-5 mm.

Using contact heaters in a multilayer lining including an open cell slab foam layer will cause a collapse of the foam in particularly in the skin of the slab foam making it impervious to air borne sound waves, thereby deteriorating the overall acoustic absorption of the part.

Another disadvantage is the fact that most thermoplastic polymers used as matrix fibres and as reinforcement fibres have their melting temperature close to each other for instance the melting temperature as measured using Differential scanning calorimetry (DSC) according to ISO11357-3 of poly ethylene terephthalate (PET) is in the range of 230-260° C., of polypropylene between 140-170° C., of Polyamide-6 (PA6.6) between 170-225° C. and of Polyamide-6.6 between 220-260° C. Using matrix fibres and reinforcement fibres both being thermoplastic polymers, for instance PA6.6 as matrix and PET as reinforcement, having to heat them above the melting temperature of the matrix fibres will also cause the reinforcement fibres to start melting or softening. This will lead to a collapse of the structure, forming a very compact composite.

Felts are widely used particularly in automotive industry for their thermal and acoustic insulation properties. The trend is towards recyclable materials; therefore thermoplastic binders have taken a significant share in the last years. Fibers made of high performance polymers such as polyesters, polyamide are highly interesting due to their mechanical and heat resistance properties. But the necessary binding agent form the limitation to their utilization in moulded 3D parts.

The binding agents used so far always have a lower melting point than the reinforcement fibres, rendering in relatively weak performance behaviour to the moulded fibre web and limiting its utilization to tempered areas in the vehicle. None of these types of moulded fibre webs is suitable for the high temperature exposure of the engine bay or compartment, particularly of the engine contact areas. Some of these binders are modified polymers (Co Polyester (CO-PET) as an example) having pour behaviours due to their modified structure being particularly sensitive to hydrolysis phenomena.

The processes for moulding such felts as known in the state of the art are a 'cold" moulding process where the felt is pre-heated by various means, and then transferred to a cold mould in which it is compressed in order to obtain the part shape or a 'hot" moulding processes, where the felt is introduced in a closed mould, in which a heat transfer media, like air, is introduced for bringing the binding agent to its melting point, and then released. The part is then cooled down, inside the tool or outside, with or without cooling assistance. (See for instance EP 1656243 A, EP 1414440 A, and EP 590112 A) Only after complete cooling down to a temperature at which the material is set, the part can be taken out of the mould and transported.

Fibrous composites as disclosed are generally used in combination with additional layers, like the reflective layers as discussed or with foam. Foam can be applied to such fibrous composites by direct back foaming (injection foaming or foam moulding) the foam. However often the foam is first produced as slab foam and cut into the thickness desired. For the lamination of the foam to adjacent fibrous layer generally hot compression moulding is used. The stack of layers is put between two hot plates to melt the material and obtain a lamination of the layers. Compression is needed to help the transfer of heat to the porous reinforcement of the layered material. A disadvantage of such a method, in particularly where foam layers are used, is that the foam collapses and forms a skin layer on the open cell structure. This skin layer deteriorates the overall acoustic absorbing performance of the open cell foam.

SUMMARY OF INVENTION

Thus it is the object of the invention to provide a process for producing a moulded multilayer lining, for in particularly the engine compartment of motor vehicles, having comparable heat insulating and sound proofing properties, but which are lighter and maintain there structure over long time exposure to the thermal load in the area of use.

The object is achieved by the production process for a steam moulded multilayer lining according to claim 1.

In particularly by using the production method according to the invention comprising at least the steps of
  blending of reinforcement fibers and polyamide matrix material in the form of fibers, flakes or powder, and forming a web of said blend;
  layering a first of said blended web and at least an additional layer chosen from an open cell foam layer, a heat reflective layer, or a second of said blended web inside a mould;
  treating the stacked multilayer material with pressurized saturated steam, such that the polyamide matrix material in the blended web is melting at a temperature under steam pressure that is lower than the melting temperature of the polyamide matrix according to DSC, thereby binding the reinforcement fibers together thus consolidating the blended web forming a porous reinforcement layer, and all layers of the multilayer are laminated together.

It was found that using a direct steam moulding process on polyamide as a binding material, the softening and melting point of polyamide is shifted to a lower temperature under steam pressure as the normal melting temperature of polyamide measured according to DSC. By using this knowledge it is now possible to make parts that in use have a higher melting temperature and are able to be heat stable at much higher temperatures than the state of the art materials. In addition it was found that the polyamide material used in the reinforcement layer is enough to also laminate adjacent layers. Surprisingly, layers like foam or heat reflective layer, without the need of additional matching glue layers. In particularly it was found that using direct steam moulding on additional foam layers did not have any negative effect, for instance melting of the foam, on the acoustic properties of the foam layer. Therefore maintaining the advantageous acoustic properties of skinless open cell foam as produced.

The production process according to the invention can be used directly to steam mould the multilayer lining in a 3 dimensional shape, like an engine bay covering panel, a top-, side- or undercover for an engine, an oil pan cover, an under engine shield, a fire wall, and at least partially covering outer dash panel, an air guiding panel behind the cooler of the engine bay, a parcel shelf or a trunk load floor, to serve as an automotive trim part in the interior of the car.

In the following the steam moulded multilayer lining according to the inventive process and the steam moulding process will be explained in more detail and with examples of the use of such material.

Production Process

In the method according to the invention, high modulus reinforcing fibres are blended with matrix forming material in the form of polyamide fibres, flakes or powder to form a web by any suitable method such as air lay, wet lay, carding etc. This web is then heated using saturated steam to melt the polyamide matrix material at a temperature that is lower than the melting temperature of the polymer as measured using Differential scanning calorimetry (DSC) according to ISO11357-3. For example the melting temperature $T_m$ of polyamide-6 (PA-6) is 220° C. as measured using DSC. However the melting temperature of the same PA-6 under steam pressure according to the invention is for example 190° C.

The web is placed in a pressure-resistant mould with at least one steam permeable surfaces. The mould is closed and clamped to withstand the internal pressure. Saturated steam of at least 9 bars absolute pressure is applied to melt the binder. Saturated steam above 20 bars absolute pressure is not economical anymore. Preferably a range of 11 to 15 bars absolute pressure is a good working range. The actual shift of the melting temperature of the polyamide is dependent on the steam pressure generated in the cavity the product is steam moulded in. The choice of the pressure used is therefore also dependent on the melting temperature of the reinforcement fibres. For instance using PA-6 as binder fibres the preferred pressures are 11 to 15 bars absolute pressure.

By using steam instead of the usual hot air, hot plates or IR wave it is possible to shift the melting point of Polyamide to a lower temperature using the effect of the water molecules in the steam. The effect of water on polyamide is known and is normally considered a disadvantage; many prior art describes ways to avoid the effect or try to prevent it. Unexpectedly it is just this effect, which makes it possible to combine polyamide material applied in the form of powder, flakes or fibres with other thermoplastic fibres with similar melting points as measured with DSC, like polyester (PET), using polyamide as the sole binding material, keeping the reinforcement fibres, like PET, in its fibrous form. It is now possible to obtain a heat stable moulded product with a porous structure thereby enhancing the acoustic properties, like absorption and airflow resistivity, as well as the thermal conductivity.

The effect of steam is based on a reversible diffusion mechanism. Using Polyamide, in form of small fibre diameter or fine particles, the melting and solidifying is fast and provides short production cycles. Once the steam is released from the mould the Polyamide transforms into the solid state and the part can be demoulded as a stiff part. This is an advantage compared to other thermoplastic binders that need to be explicitly cooled inside or outside the mould before obtaining a structural part which is to be handled.

Because the overall temperature used, can now be kept much lower in comparison with the heating methods without steam, the resilience of the PET fibres is staying intact, leading to a more lofty material. Furthermore it was found that the binding of the PA was enough to obtain the required stiffness of the final product. Because the PET fibres keep their resilience and the PA molten matrix material only binds the crossing points. The material keeps its lofty appearance due to the void volume in the web. Therefore the final product will still be air permeable. Furthermore it was found that also using glass fibres as the reinforcement fibres together with polyamide as the matrix the use of steam is advantageous. Due to the precise regulation of the binding properties less energy is needed for the process, both during heating and during cooling.

In the heating process according to the state of the art the material is heated up to the melting point of the thermoplastic matrix material. The cooling down of the material is slow due to the slower convection of the heat out of the product and because the material collapsed, due to lack of resilience of the reinforcement fibres and has become compacter. So the molten condition will continue for a longer period. As a result it is more difficult to regulate the amount of binding. Furthermore during this cooling period the material stays soft because of the longer melted state of the binding matrix and is therefore more difficult to handle. This is in particularly the case for larger automotive trim parts, like headliner or load floor for a truck or larger vehicle.

Unexpectedly, it was found, that using the material and the process according to the invention, as soon as the steam was taken away from the material the process of melting immediately stopped and the material obtained is at solid state again. This is an advantage in the ability to reduce production cycle times due to immediately hand able material. The fact that the melting process can be stopped immediately is also a very precise way of regulating the binding properties and therefore the porosity of the material. Which is important for the air permeability properties of the material.

The use of polyamide in a discrete form like flakes, powder or fibers, is necessary to guarantee a discrete binding of the reinforcement fibers, to obtain a porous but consolidated structure. Due to the discrete but full consolidation of the reinforcement fibers a high bending stiffness as well as dynamic stiffness can be obtained. As the material chosen preferably are thermo stable above at least 180° C., a material is obtained that maintains its structure, in particularly will not soften or sack upon long time exposure to a high thermal load. As the consolidation of the polyamide and the reinforcement fibers is only based on the softening and melting of the polyamide under influence of the direct treatment with saturated steam under pressure, it is not necessary to compress the reinforcement layer more than necessary to obtain the wanted 3 D shape of the final product.

Surprisingly it was found that laminating of additional layers to the porous reinforcement layer is possible in the same steam moulding process step. It was even found that the PA matrix material was strong enough to be used as laminating binder to bind additional layers for example in a combination with an open cell foam layer and/or a reflective layer such as aluminium foil and/or a scrim layer.

Even more surprisingly it was found that using the steam moulding in the temperature range according to the invention the foam material was not changed in acoustic performance. In the normal hot moulding methods according to the state of the art the foam is normally heated to a temperature at which the foam softens and forms a skin at the outer layer or even worst shrinks in volume or collapses. This has a deteriorating effect on the quality of the foam after the moulding as well as on the acoustic performance. An unwanted shift can be seen in the sound absorption after moulding, while comparing to the original state. At worst the shift can be transformed in a lost of sound absorption overall.

Steam is known to regenerate the foam back to its original components and therefore normally not used for moulding of parts where a degeneration of the material is unwanted. Surprisingly the process according to the invention does not show any measurable impact on the structural and acoustic properties of the foam treated. As the foam is in particularly not melting during the steam process the originally obtained open cell structure during the foam production is maintained. The binding of the porous reinforcement layer with the foam layer is solely coming from the molten droplets of polyamide binder material. This is enough to obtain a stable laminate binding. This has the additional advantage that in thermally loaded environments like the engine bay the temperature for delamination is much higher than with the material normally used. In addition the thermally weak link is no longer the binder itself.

It was even found that reflective material could be laminated directly with the porous reinforcement layer according to the same principle. However in the case of metal foils, in particularly aluminium foils the lamination surface in contact with the porous reinforcement layer might be pre-treated to enhance the lamination.

If necessary an additional polyamide binder layer, in the form of a film, powder, flakes or a scrim layer can be put in-between the layers to enhance the binding properties.

The Porous Reinforcement Layer

The porous reinforcement layer is an air permeable composite with increased stiffness of randomly disposed binding material and reinforcement fibers held together at fibre crossover locations by essentially discrete droplets of the thermoplastic binding material.

The material used as thermoplastic binding material is a polyamide matrix in the form of powder, flakes or fibres. The use of polyamide fibres in the porous reinforcement layer is the most preferred, as fibres generally blend together better and stay that way during the handling of the web before consolidation. In particularly flakes or powder can fall between the reinforcement fibres out of the web by handling without consolidation.

As polyamide all types of mixtures of polyamide are feasible, preferably at least one of COPA (Co-polyamide), Polyamide-6 (PA-6) or Polyamide-6.6 (PA6.6). It is expected that normal used additives in the basic polyamide recipe are part of the basic polyamide material as claimed, for example chemical compounds to obtain Ultra Violet Resistance or additional chemicals for increasing heat stability.

The use of polyamide binding fibers is most preferred and used in the examples and preferred embodiments however the use of powder or flakes can be used as well in the same examples with comparable results.

The reinforcement fibers can be
  mineral based fibers, like glass fibers, basalt fibres or carbon fibers, and/or
  man-made fibers having a melting temperature measured according to DSC, which is higher than the melting temperature of the polyamide under steam pressure, like polyester fibers, and/or
  natural fibers, like flax, coconut or kenaff fibers.

In particularly the reinforcement fibres can be any thermoplastic polymer based material with a melting temperature according to the DSC measurement, which is higher than the melting temperature of the polyamide binder material in a steam environment. For instance man made fibers like PET (polyester terephthalate) with a melting temperature of between 230-260° C. can be used as reinforcement fibre. The choice of material is based on the overall heat stability requirements of the final product and on the price of the individual materials.

Also mixtures of man made fibers with mineral fibers can be used as reinforcement fibres, for instance PET together with glass fibers (GF). Using such combinations will increase the loftiness of the final layer and can be defined as an acoustic reinforcement layer, see separate description of this layer for more details. The reinforcement fibres can be cut fibres, endless filaments or roving dependent on the material properties needed.

The starting material for the reinforcement layer is a mat of randomly disposed binding material and reinforcement fibres, that can be made according to methods known in the art, for instance using air laid, or carding technology or by direct forming after extrusion of the fibre materials. The produced mat can be pre consolidated to enable easier handling for instance by needling.

The ratio of polyamide binding material to reinforcement fibres is such that after the steam treatment the material stays porous. Preferably between 20 and 60% by weight of polyamide binding material.

Acoustic Reinforcement Layer

The acoustic reinforcement layer is a lofty version of the reinforcement layer with increased sound absorbing properties.

The binder material is the same as disclosed for the porous reinforcement layer, however the reinforcement fibres can be any combination or blend of mineral based fibers, like glass fibers, basalt fibres or carbon fibers, and man made fibers having a melting temperature measured according to DSC, which is higher than the melting temperature of the polyamide under steam pressure, like polyester fibers, an/or natural fibers, like flax, coconut or kenaff fibers. For example a combination of PET (polyester terephthalate) with a melting temperature of between 230-260° C. together with glass fibers would work well as reinforcement fibres.

It was found that by using such a combination of fibres the material maintains its loftiness during the steam moulding process. The material does not only have an increased stiffness, but also an increased acoustic absorption.

Mineral fibers like glass fibers are fine fibers and as such preferred for acoustic absorption, however upon heat treatment they tend to loose their volume, and therefore the original sound absorptive properties. Surprisingly, it was found that man made fibers or natural fibers chosen properly, such as polyester fibres or kenaf fibers, maintain their rigidness during the steam moulding of the lining material. Therefore the volume of the material is maintained and the consolidated material stays porous, hence the original acoustic absorbing properties are still given.

Preferably a mixture of approximately 20-40% by weight of polyamide, approximately 20-50% by weight of Glass fibers and 20-50% by weight of Polyester fibers or natural fibers, would work well.

The reinforcement fibres can be cut fibres, endless filaments or roving dependent on the material properties needed.

Heat Reflective Layer

Together with the fibrous porous reinforcement layer at least a heat reflective layer can be used. The surface facing the heat source, generally the engine or parts of the power train or exhaust line or the surface exposed to sunlight, may be covered, either partially or completely, with a heat reflective covering layer at least in the area of increased thermal load. The reflective covering layer should be heat stable and able to reflect infrared radiation either from the heat source or the sun, to obtain a good heat insulation of the trim part, preferably the reflective covering layer is one of a metal foil layer, preferably stainless steel or aluminium foil layer, or an aluminised textile or nonwoven, or a textile made of aluminium fibres. The heat reflective layer should at least be able to resist steam treatment without deterioration.

The reflective covering layer is preferably between 20 and 150 μm, more preferably between 50 and 80 äm. The low thickness can be used since the reinforcement layer is performing the main static function, the reflective layer its only function is in principle reflecting heat radiation.

Although not necessary in all cases the reflective covering layer can be at least partially micro perforated. The micro perforating can be done by known technologies like needling, slitting, micro fissuring or punch technologies. By means of an optional perforation of the reflective layer, the heat reflecting effect of the layer is maintained, however the transmittance for acoustic waves is achieved in this area so that the aluminium foil-cladded side of the multilayer lining facing the source of sound maintains the acoustic activity thereof.

Particularly in the case the reflective covering layer material of choice is non porous or non perforated, the heat entrance preferably should be at the side of the fibrous trim part that is not covered with the reflective covering layer to optimise the steam penetration into the porous reinforcement layer.

In case of the use of reflective covering layers at both sides of the material, at least one of the layers used should be perforated and/or porous enough to enable a steam flow in the fibrous layer.

Also a reflective material layer can be used in between two reinforcement layers according to the invention. This layer preferably is perforated or porous, however the foil being perforated or porous is not necessary, if the steam flow is entering the mould from both mould halves instead of via only one mould halve.

Foam Layer

As an additional layer an open cell foam layer can be used. The foam is preferably skinless foam. Slab foam, produced continuously or discontinuously, is most preferred, as this foam is cut into sheets after foaming and curing, therefore the open cell structure is directly accessible without any skin.

Preferably the foam layer is at least short-term thermo stable between 160 and 220° C., for instance it is made of open cell polyurethane (PUR) foam, or a polyester (PET) foam.

Polyurethane foams are made by addition reaction of polyisocyanates and polyols. Additives are used as needed. Examples of PUR foams that can be used in the lining according to the invention are for instance disclosed in EP 0937114 or EP 937109 A.

In particularly for the use in the engine bay area or in areas with an increase thermal load the use of a flame retardant for instance treatment with a liquid and/or solid retardant and or incorporating such a retardant in the foam is favoured. The use of foam with additional graphite for instance as disclosed in EP 1153067 or U.S. Pat. No. 6,552,098 would be preferred.

The full disclosure of these documents in particularly regarding the production process and the material composition of the slab foam are incorporated herein by reference.

Industrial available foams, prepared as slab foams, that can be used with the lining according to the invention are for instance ACOUSTIFLEX S15 (semi-rigid), or ACOUSTIFLEX F 25 (flexible) from Huntsmann, or Flexidur 15 FR+ (semi-rigid) or Rigidur 10 (semi-rigid) by Foampartner or the range of Thermoflex semi-rigid foams in different grades and densities made by Eurofoam like for instance Thermoflex 15, Thermoflex 15 MDA, Thermoflex 15 MDA VW, Thermoflex 16, Thermoflex 22 and the flexible Thermoflex foams like T-flex 16 or T-flex 22.

Preferably the density of the foam is between 8 and 40 kg/m, more preferably between 12 and 30 kg/m$^3$. As the open cell foam will add to the overall noise attenuation of the lining according to the invention, the air flow resistance is preferable in the range of 100 to 5000 (Ns·m$^3$) for a thickness of between approximately 6 and 45 (mm) for the slab foam before moulding.

Surprisingly it was found that the foam layer does not change its acoustic properties during the steam treatment, in particularly the time and conditions are such that the foam is keeping the open cell foam structure. In particularly, the closure of the skin layer, as can be seen with foam laminated in a standard hot moulding tool, could not be observed with the method according to the invention. Therefore the acoustic properties of the open cell foam are fully maintained in the lining according to the invention.

If the lining is used for a structural part with a high mechanical load the foam layer used can be chosen to enhance the overall structural properties, for instance by choosing a more rigid foam layer, for instance made of polyurethane or polyester, or by adding reinforcement fibers to the foam layer.

Additional Layers

Preferably additional layers can be used. For instance an aesthetic cover, or an anti sticking layer, to prevent the laminated lining from sticking to the walls of the moulds can be needed. Preferably a scrim layer made of thermoplastic fibrous material, thermo resistant to the temperature range as given during the steam moulding is used.

A scrim is a thin nonwoven with a thickness between 0.1 and around 1 (mm), preferably between 0.25 and 0.5 (mm). Preferably they have an increased airflow resistance (AFR) of between 500 and 3000 (Nsm$^{-3}$), more preferably of between 1000 and 1500 (Nsm$^3$).

The area weight of the scrim layer can be between 15 and 250 (g/m$^2$), preferably between 50 and 150 (g/m$^2$).

The scrims can be made from continuous or staple fibres or fibre mixtures. The fibres can be made by meltblown or spunbond technologies. They can also be mixed with natural fibres. Preferably the material chosen is heat stable over long time thermal load exposure. The scrims can be made of fibres for example made of polyester, or polyamide, or oxidized, thermally stabilized polyacrylonitrile (PAN, also known as PANox) or a combination of fibres for instance of polyester and cellulose, or polyamide and polyester. The layer can be treated with the usual treatment necessary for the area of appliance, like for instance oil repellent, water repellent, flammability treatment etc. A preferred example of a scrim layer can be a nonwoven scrim layer made of polyester and viscose fibres.

When the lining according to the invention is used in the passenger area also alternative covering layers, like nonwoven carpet or tufted carpet can be used. These layers might be added also after the steam moulding process step, by using conventional methods known in the art.

In the steam moulding process, a polyamide scrim layer can be used in addition to laminate additional layers not directly adjacent to the reinforcement layer and/or to increase the amount of binding material in the laminating zone. The polyamide can also be sprinkled in form of powder or flakes on the surface before adding additional layers, or applied as a thin adhesive foil or netlike structure. So also other layers not directly adjacent to an reinforcement layer can be laminated to the multilayer lining according to the invention for instance different aesthetic covering layers, like for instance tufted or nonwoven carpet layer, flock material or nonwoven covering materials.

Multilayer Lining

The steam moulded multilayer lining produced according to the invention comprises a porous reinforcement layer, and at least a second layer chosen from a foam layer, a reflective layer, or a second porous reinforcement layer.

Additional layers can be used as well, such as additional foam layers or reinforcement layer or like aesthetic covering layers, or technical scrim layers to further enhance the properties of the multilayer lining according to the invention. Also the use of similar layers with different densities can be foreseen. If for instance two foam layers are used in direct contact, also the use of a polyamide binding layer, in the form of a polyamide fibrous scrim, web, perforated foil, powder or flakes can be used. The use of polyamide as additional binding layer is advantageous, as it will react to the steam in the same way as the matrix material in the reinforcement layer.

The porous reinforcement layer is mainly forming the structural stiffness necessary. In most applications the lining is used as a self-supporting structure.

In a preferred application the multilayer lining comprises at least two layers chosen from a porous reinforcement layer and an acoustical porous reinforcement layer. Preferably both layers are only connected to each other at the rim of the lining or by using spacers, leaving a hollow space in between the main surfaces of the layers. The hollow space functions as an additional acoustic absorbing area and an acoustic and thermal decoupling zone. By using at least one acoustic porous reinforcement layer, the overall acoustic performance can be increased.

In the engine bay area different types of trim parts are used, for instance engine encapsulation, engine top coverings as well as engine encapsulation that is mounted to the chassis of the vehicle. Furthermore also other components like bonnet lining, outer bulkhead lining as well as under engine shields and vertical elements along the front beams can be placed in the engine compartment, to optimise the heat management of the engine compartment. In particularly a hood lining, firewall, or cover members adjacent the automotive engine like engine head cover, engine side panels, as well as other lining used in a vehicle in thermally exposed areas like the power train, including the gearbox, exhaust line, in particular heatshields mounted on body and power train and/or the exhaust line. Also all types of under body panels used, in particularly under the engine and the passenger compartment fall into the scope of use for the inventive lining.

These and other characteristics of the invention will be clear from the following description of preferential forms, given as non-restrictive examples with references to the attached drawings.

With help of the figures examples of adventurous combinations of layers for specific applications will be given, to explain the invention even further. However the invention should not be restricted to these examples, they are more meant to show the possibilities of the lining according to the invention.

DESCRIPTION OF EMBODIMENTS

Figure 1:
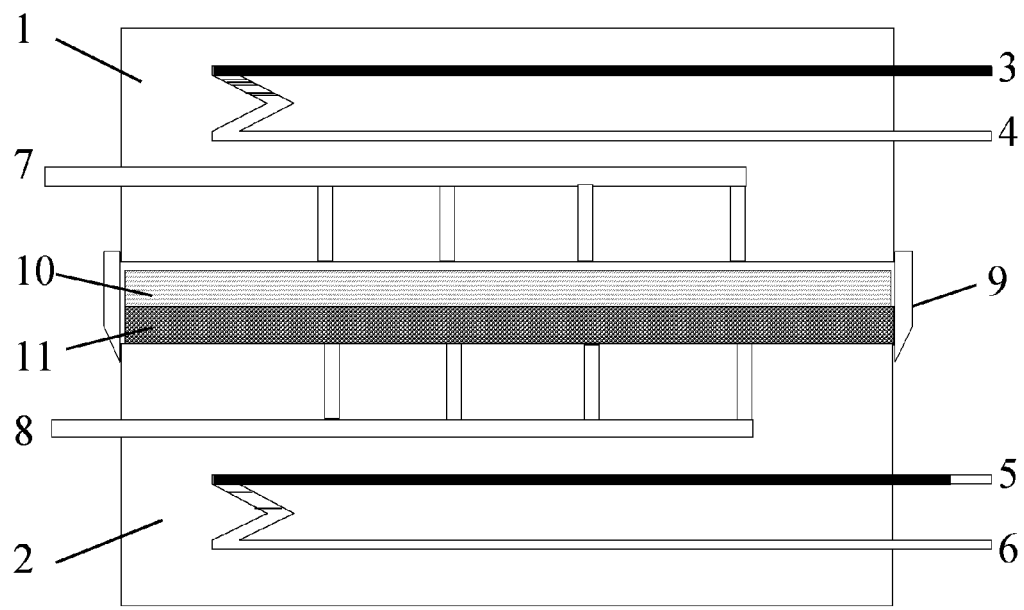
FIG. 1 is a schematic overview of the steam treatment according to the invention

The production process will be explained in more detail using FIG. 1 showing a steam mould comprising a lower mould half 2 and an upper mould half 1. These two mould halves together define a mould cavity in which the semi-finished product will be at least consolidated. The mould cavity can be formed in the wanted three-dimensional shape of the final trim part. As a semi-finished product a nonwoven fiber mat with a blend of binding material and reinforcement fibres 10 together with for example foam layer 11. Preferably the two halves of the mould have in and out lets 7,8 through which the saturated steam can flow into the mould cavity coming in direct contact with the multilayer material to be consolidated and laminated. As saturated steam is used it is preferred that the mould halves are kept warm to help pressure built up and prevent steam condensation. As steam condensation would cause a loss of the heat energy and would cause a soaking of the product with water. In the figure this is shown with the channels 3,4,5 and 6, showing a closed heating system for the mould halves. The heat of the mould halves is not important for the moulding of the lining.

The mould can have additional cutting and sealing elements 9 at its edges; these can be moved and pushed independently, and they make a perimetral, pressure-tight sealing of the mould, i.e., through a labyrinth seal. After pressure-tight sealing of the mould, the semi-finished product is exposed to saturated steam. The steam is used as pressurised steam with a pressure in the mould cavity of between approximately 2-20 (bar absolute), preferably a pressure of at least 9 (bar absolute), and remains under this pressure in the mould cavity during the entire consolidation period.

The process time is governed by steam pressure rising and release for consolidation. Preferably before opening the press mould, the pressurised steam is released. Although some water does condensate during the steam treatment and is left in the lining material according to the invention, this will dry up after opening of the mould, mainly due to the residual thermal energy left in the core of the part. Surprisingly as soon as the steam pressure is taken away, the softening and melting of the polyamide is reversed and the part is solidified. The steam process is therefore not only advantageous due to the short dwell times needed, it also eliminates any cool down time, needed with the traditional compression moulding with dry systems before the moulded part can be removed from the mould cavity.

An example of a production method for a multilayer lining according to the invention contains at least the steps of:

blending of 40 to 80% of reinforcement fibers and 20 to 60% of polyamide matrix material in the form of fibers, flakes or powder, and forming a web of said blend;

layering a first blended web and at least an additional layer chosen from an open cell foam layer, a heat reflective layer, or a second blended web of reinforcement fibers and polyamide matrix material, inside a mould consisting of two mould halves;

treating the stacked multilayer material with pressurized saturated steam, such that the polyamide matrix material in the blended web is melting at a temperature under steam pressure that is lower than the melting temperature of the polyamide matrix according to DSC, thereby binding the reinforcement fibers together thus consolidating the blended web forming a porous reinforcement layer, and such that the stacked layers are laminated together.

The mould halves can be fully closed at the start or can be closed during the steam treatment, letting out some of the steam at the beginning and/or at the end of the steam process. The saturated steam pressure is preferably used in a range of 9 to 20 (bar absolute).

At least one additional scrim layer can be used to prevent the layered material from sticking to the mould. For instance a polyester-cellulose nonwoven scrim layer. The stacked multilayer material can contain even further additional layers like an additional layer of a blended web, a foam layer. The polyamide matrix is preferably co-polyamide or polyamide-6 or polyamide-6.6 or a mixture of these polyamides.

The moulded saturated porous multilayer lining, produced according to the production process as disclosed can be directly moulded in a 3-D shape to serve as an automotive trim part, like an engine bay covering panel, a top-, side- or undercover panel for an engine, an oil pan cover, an under engine shield, a fire wall, an at least partially covering outer dash panel, an air guiding panel behind the cooler of the engine bay, a parcel shelf or a trunk load floor.

Figure 2:
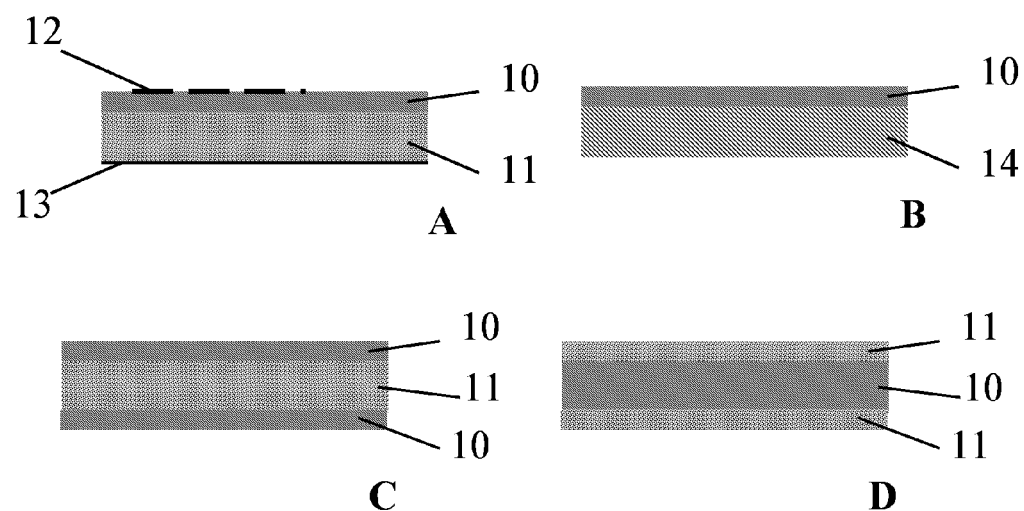
FIG. 2 shows schematically the layering of the lining material according to the invention.

The steam moulded multilayer lining can be most advantageously used in areas of increase thermal load in a vehicle, like in close vicinity of the engine, power train and exhaust, but also in the trunk area or as trim part which are exposed to sunlight directly behind the window of a car, like parcel shelf or sunscreens, FIG. 2 shows examples of possible multilayer lining materials. For the basis of the lining according to the invention a porous reinforcement layer or an acoustic porous reinforcement layer can be chosen. The difference is that the reinforcement layer is mainly made of polyamide matrix and reinforcement fibers. While the acoustic reinforcement layer consists of the polyamide matrix and reinforcement fibers, however the reinforcement fibres is a blend of man made fibers and mineral fibers, for instance a blend of polyester and glass fibers, giving a more lofty layer after consolidation using the steam process.

FIG. 2 A shows an example with a porous reinforcement layer 10 and an open cell foam layer 11, preferably an infrared reflecting layer 13 can at least partially cover at least one of the outer surfaces of the lining. While also a scrim layer 13 can be used to cover the outer surface of the lining. Instead of the porous reinforcement layer 10 an acoustic reinforcement layer can be used in situation where a higher level of sound absorption is needed.

Generally the reinforcement layers can replace injection-moulded plastic layers, normally used in automotive trim parts as it has comparable stiffness properties. However due to its porosity it shows sound absorbing properties, what is not the case for injection moulded parts. The use of additional absorbing layers even increases the sound absorption.

For automotive trim parts used in a hot environment, particularly in the engine bay area, the combination of the porous reinforcement layer with an open cell foam layer is a good choice as it is very light and will suit most acoustic requirements.

For trim part used in areas with an increased thermal load, like direct engine mounted parts, the use of the combination of a porous reinforcement layer with the loftier acoustic porous reinforcement layer is a better option.

The heat reflective layer can be used in particularly at the surface or partially at the surface that is directed to the heat source, and/or that obtains the most direct heat energy.

The porous reinforcement layer 10 can also be combined with the acoustic reinforcement layer 14 (FIG. 2B)

FIGS. 2C, and 2D show examples of at least three layers. In 2C a foam layer 11 is sandwiched between two reinforcement layers 10, although here the standard reinforcement layers are used also two acoustic reinforcement layers or one of each type, can be used, depending on the situation the multilayer lining is used. In particularly in high thermal load areas of the car where the foam needs thermal protection, this is an option. Preferably also with at least partially covering with a reflective surface (not shown) and or a scrim layer.

FIG. 2 D shows a sandwich with a reinforcement layer 10 as a core layer, sandwiched between two foam layers 11. This layout is an advantage if used in areas, where the passenger and or service personal come in regular contact with the surfaces. Glass fibers if they stick out of the lining surface have a nasty stinging effect, which is at the least unpleasant. Foam would cover the glass fiber surfaces, preventing this site effect. The reinforcement layer will bring the main structural properties, and therefore the foam can be a semi rigid or even a softer open cell foam type as would have normally been used.

The invention claimed is:

1. A production method for a multilayer lining for thermal and sound insulation, comprising the steps of:
    blending reinforcement fibers with a polyamide matrix material, in the form of fibers, flakes or powder, to form a blended web;
    layering the blended web inside a mould with at least one additional layer forming a stacked multilayer material, where each of the additional layers is an open cell foam layer, a heat reflective layer, or a further blended web;
    treating with pressurized saturated steam the stacked multilayer material in the mould, the pressurized saturated steam having a temperature sufficient to melt the polyamide matrix material in each blended web, the melted polyamide matrix material consolidating the reinforcement fibers in each blended web into a porous reinforcement layer, while simultaneously laminating the layers of the stacked multilayer material into a multilayer lining.

2. The method of claim 1, wherein the blended web contains reinforcement fibers in the range of between 40 to 80% by weight, with the balance being the polyamide matrix material.

3. The method of claim 1, wherein the saturated steam has a pressure in the range of 9 to 20 atmospheres absolute.

4. The method of claim 1, wherein, in the layering step, at least one scrim layer is included in the stacked multilayer material.

5. The method of claim 1, wherein, when present, the heat reflective layer only partially covers a layer adjacent thereto.

6. The method of claim 1, wherein the reinforcement fibers are selected from a group comprising mineral based fibers, man made fibers having a melting temperature higher than the melting temperature of the polyamide under steam pressure, and natural fibers.

7. The method of claim 1, wherein the reinforcement fibers are a blend of mineral based fibers, and one selected from a group comprising man made fibers having a melting temperature higher than the melting temperature of the polyamide under steam pressure, and natural fibers.

8. The method of claim 1, whereby the reinforcement fibers forming the reinforcement layer is a mixture of 20-40% by weight of polyamide reinforcing fibers, 20-50% by weight of glass fibers, and 20-50% by weight of polyester and/or natural fibers.

9. The method of claim 1, wherein the polyamide matrix is polyamide-6 or polyamide-6,6 or co-polyamide or a mixture of different types of polyamide.

10. The method of claim 1, wherein the open cell foam layer, when present, is a skinless foam.

11. The method of claim 10, wherein the open cell foam layer is polyurethane (PUR) foam or polyester (PET) foam or a fiber filled foam.

12. The method of claim 1, wherein, in the treating step, the mould conforms the multilayer lining into a three dimensional shape.

13. The method of claim 1, wherein the treating step comprises the substeps of:
    closing and clamping the mould with the stacked multilayer material layered therein:
    applying the pressurized saturated steam into the closed and clamped mould, melting the polyamide matrix material;
    releasing the steam pressure from the closed and clamped mould, resolidifying the polyamide matrix material; and
    unclamping and opening the mould to release the multilayer liner as a stiff part.

14. The method of claim 1, wherein the pressurized saturated steam has a saturation temperature that is between the temperature at which the polyamide matrix material melts in the presence of pressurized saturated steam and the temperature at which the polyamide matrix material melts according to Differential Scanning calorimetry.

* * * * *